(12) United States Patent
Ates et al.

(10) Patent No.: US 11,276,848 B2
(45) Date of Patent: Mar. 15, 2022

(54) ELECTROPLATING TRANSITION METAL OXIDES AS PROTECTIVE COATING AGENTS FOR LI-ION BATTERY MATERIALS

(71) Applicants: Mehmet Nurullah Ates, Kettering, OH (US); John David Busbee, Beavercreek, OH (US); Chadd Timothy Kiggins, Dayton, OH (US); John Berkeley Cook, Beavercreek, OH (US)

(72) Inventors: Mehmet Nurullah Ates, Kettering, OH (US); John David Busbee, Beavercreek, OH (US); Chadd Timothy Kiggins, Dayton, OH (US); John Berkeley Cook, Beavercreek, OH (US)

(73) Assignee: Xerion Advanced Battery Corporation, Kettering, OH (US)

( * ) Notice: Subject to any disclaimer, the term of this patent is extended or adjusted under 35 U.S.C. 154(b) by 253 days.

(21) Appl. No.: 16/670,006

(22) Filed: Oct. 31, 2019

(65) Prior Publication Data

US 2020/0144593 A1    May 7, 2020

Related U.S. Application Data

(60) Provisional application No. 62/755,724, filed on Nov. 5, 2018.

(51) Int. Cl.
*H01M 4/04* (2006.01)
*H01M 10/052* (2010.01)
(Continued)

(52) U.S. Cl.
CPC ....... *H01M 4/0452* (2013.01); *H01M 4/0404* (2013.01); *H01M 4/131* (2013.01); *H01M 4/133* (2013.01); *H01M 4/134* (2013.01); *H01M 4/1391* (2013.01); *H01M 4/1393* (2013.01); *H01M 4/1395* (2013.01);
(Continued)

(58) Field of Classification Search
CPC .. H01M 4/0452; H01M 10/052; H01M 4/131; H01M 4/134; H01M 4/133; H01M 4/1391; H01M 4/1393; H01M 4/1395; H01M 4/505; H01M 4/525; H01M 4/386; H01M 4/587; H01M 4/623; H01M 4/625; H01M 4/0404; H01M 4/62; H01M 10/0525; H01M 4/366; Y02E 60/13; Y02E 60/10; C25D 9/06; C25D 3/00; H01G 11/46; H01G 11/86; H01G 11/50
See application file for complete search history.

(56) References Cited

U.S. PATENT DOCUMENTS

2016/0028081 A1 * 1/2016 Zhang ................. C01G 53/44
429/231.1

* cited by examiner

*Primary Examiner* — Andrew J. Oyer
(74) *Attorney, Agent, or Firm* — O'Banion & Ritchey LLP; John P. O'Banion; Bart S. Hersko (57) ABSTRACT

A method of electrodepositing a transition metal oxide on to the surface of cathode or anode active materials used in Li-ion batteries, using an aqueous media. The transition metal oxide coating protects the cathode or anode active materials once they are fully delithiated or fully lithiated, respectively. The protective coating may be used also in gas sensors, biological cell sensors, supercapacitors, catalysts for fuel cells and metal air batteries, nano and optoelectronic devices, filtration devices, structural components, and energy storage devices.

18 Claims, 8 Drawing Sheets

(51) Int. Cl.
*H01M 4/131* (2010.01)
*H01M 4/134* (2010.01)
*H01M 4/133* (2010.01)
*H01M 4/1391* (2010.01)
*H01M 4/1393* (2010.01)
*H01M 4/1395* (2010.01)
*H01M 4/505* (2010.01)
*H01M 4/525* (2010.01)
*H01M 4/38* (2006.01)
*H01M 4/587* (2010.01)
*H01M 4/62* (2006.01)

(52) U.S. Cl.
CPC ........... *H01M 4/386* (2013.01); *H01M 4/505* (2013.01); *H01M 4/525* (2013.01); *H01M 4/587* (2013.01); *H01M 4/623* (2013.01); *H01M 4/625* (2013.01); *H01M 10/052* (2013.01)

ELECTROPLATING TRANSITION METAL OXIDES AS PROTECTIVE COATING AGENTS FOR LI-ION BATTERY MATERIALS

CROSS REFERENCE TO RELATED APPLICATIONS

This application claims the benefit of and priority to the filing date of U.S. provisional application Ser. No. 62/755,724 filed Nov. 5, 2018, incorporated herein by reference in its entirety.

FIELD OF THE INVENTION

The present disclosure generally relates to a method for electroplating (or electrodeposition) a transition metal oxide composition to protect cathode active materials used in Li-ion batteries once they are being charged to high potentials. The protective coating may be used also in gas sensors, biological cell sensors, supercapacitors, catalysts for fuel cells and metal air batteries, nano and optoelectronic devices, filtration devices, structural components, and energy storage devices such as primary and secondary batteries.

BACKGROUND OF THE INVENTION

Li-ion batteries (LIB) are the "Holy Grail" technology that drives many of the advanced technologies including consumer electronics such as laptops, cell phones, spacecrafts, unmanned aerial vehicles (UAVs) and most importantly in the near future electric vehicles (EVs). These batteries are comprised of a cathode, which host Li ions, a $Li^+$ containing electrolyte submerged into a separator and an anode in which Li ions can be intercalated into and de-intercalated from. Though significant research efforts have dwelled on alternative chemistries, $LiCoO_2$ is still one of the most widely used cathode active materials for Li-ion batteries.

Although it has high electronic conductivity, high average voltage profile and excellent cycle life, one major drawback for $LiCoO_2$ cathode active materials is low gravimetric capacity. In a conventional Li-ion battery utilizing $LiCoO_2$ as the cathode, specific capacity of the LIB only reaches to ~145 mAh/g accounting for roughly half of the theoretical capacity (~280 mAh/g). Typical voltage profile to charge and discharge $LiCoO_2$ cathode active material versus lithium metal foil is between 4.3 to 3V. In order to attain full theoretical capacity of $LiCoO_2$ (~280 mAh/g), one has to charge the $LiCoO_2$ to higher potentials greater than 4.3V (e.g., 4.5 and 4.6V).

At high potentials, $LiCoO_2$ experiences rapid structural deformation due to hexagonal to monoclinic phase changes, parasitic surface reactions and possible Co dissolution which all together lead to catastrophic capacity failures during cycling (see Yong Jeong Kim, Hyemin Kim, Byoungsoo Kim, Donggi Ahn, Joon-Gon Lee, Tae-Joon Kim, Dongyeon Son, Jaephil Cho, Young-Woon Kim, Byungwoo Park, *Chem. Mater.* 2003, 15, 1505-1511). Due to such challenges, bare $LiCoO_2$ cathodes are not suitable to be cycled at high potentials in order to attain high gravimetric capacity. Transition metal oxides coating techniques are well known for improving cycle life and gravimetric capacity of $LiCoO_2$ cathode-based batteries when charged to higher potentials i.e. between 4.4-4.6V. Despite the fact that the underlying mechanism of such improvement is under debate (see Zhaohui Chen and J. R. Dahn, *Electrochemical and Solid-State Letters*, 6, (11), A221-A224, 2003), attributions to the electrochemical improvement can be categorized as: i) to mitigate the reaction between the electrolyte and electrode surface at high potentials (see Christian M Julien, Alain Mauger, Karim Zaghib, and Henri Groult, *Inorganics.* 2014, 2) ii) effective inhibition of transition metal, i.e., Co, dissolution at high potentials (see Yong Jeong Kim, Jaephil Cho, Tae-Joon Kim, and Byungwoo Park, *Journal of The Electrochemical Society*, 150, (12) A1723-A1725, 2003) and iii) decrease in the degree of crystallographic phase changes (see Jaephil Cho, Yong Jeong Kim, and Byungwoo Park, *Chem. Mater.* 2000, 12, 3788-3791).

Another promising cathode is $LiMn_2O_4$, known as spinel, which delivers around 120 mAh/g reversible specific capacities. LMO spinel cathode materials are receiving great attention as Mn is more abundant and environmentally friendly than Co. One of the major problems pertaining to spinel LMO cathode material is that it undergoes structural deformation during cycling, commonly attributed to Jahn-Teller distortion, which leads to capacity fade even in the first 50 cycles (see Chun Zhan, Jun Lu, A. Jeremy Kropf, Tianpin Wu, Andrew N. Jansen, Yang-Kook Sun, Xinping Qiu and Khalil Amine, *Nature Communications* volume 4, Article number: 2437, 2013). In order to circumvent or mitigate this fade mechanism, several approaches were presented in the literature. Amongst them are i) nano-scale surface doping (see Jun Lu, Chun Zhan, Tianpin Wu, Jianguo Wen, Yu Lei, A. Jeremy Kropf, Huiming Wu, Dean J. Miller, Jeffrey W. Elam, Yang-Kook Sun, Xinping Qiu and Khalil Amine, *Nature Communications* volume 5, Article number: 5693 (2014), ii) transition metal doping (see Li Guohua, H. Ikuta, T Uchida and M. Wakihara, *J Electrochem. Soc.* 1996 volume 143, issue 1, 178-182) and iii) conductive agent coating (see Laila Jaber-Ansari, Kanan P. Puntambekar, Soo Kim, Muratahan Aykol, Langli Luo, Jinsong Wu, Benjamin D. Myers, Hakim Iddir, John T Russell, Spencer J. Saldaña, Rajan Kumar, Michael M Thackeray, Larry A. Curtiss, Vinayak P. Dravid, Chris Wolverton and Mark C. Hersam, *Advanced Energy Materials*, Volume 5, Issue 17, Sep. 9, 2015, 1500646).

SUMMARY OF THE INVENTION

In the present invention, electroplating transition metal oxide as a coating agent for various commercially available Li-ion battery electrodes is presented. In one preferred embodiment, Mn based metal oxide was selected for the coating agent as it is cheap and non-hazardous compared to other transition metals such as Co. The invention utilizes aqueous media, similar to that disclosed in U.S. Pat. No. 8,237,538B2 issued Aug. 7, 2012, incorporated herein by reference in its entirety, for electroplating transition metal oxide which is cheap and easy to scale up. The present invention is versatile which means it can be applied to various chemistries for both cathode and anode materials. The cathode and anode material that is going to be electroplated with metal oxide coating agent can be used after their final stage where they are ready to be introduced into the battery assembly line. This means the deposition medium does not damage binders such as polyvinylidene fluoride (PVDF), carboxymethyl cellulose (CMC), polyacrylic acid (PAA), styrene butadiene rubber (SBR) and conductive carbons such as graphite, carbon nanotubes and other type of conductive additives. Overall, the electrode still is intact after the metal oxide deposition. One of the most important aspects of the invention is the speed of the deposition.

Electroplating metal oxide on cathode or anode materials usually takes less than 20 minutes. Additionally, no heat treatment is necessary to process the electroplated metal oxide. Simple oven drying under dynamic vacuum at 60° C. is sufficient before feeding the coated cathode or anode to the battery assembly line. Controlling deposition parameters also allows one to tune the porosity and texture of the metal oxide. Adhesion of the electroplated metal oxide on the electrode is also dictated by the wave form of deposition parameter. By adjusting the wave form, more robust adhesion of electroplated metal oxide can be achieved. There are myriad reported methods in the literature for plating metal oxide (see e.g., the review paper by C. Li, H. P. Zhang, L. J. Fu, H. Liu, Y. P. Wu, E. Rahm, R. Holze, H. Q. Wua, Cathode materials modified by surface coating for lithium ion batteries, *Electrochimica Acta*, Volume 51, Issue 19, 20 May 2006, Pages 3872-3883). However, several common problems associated with earlier metal oxide coatings can be classified as follows: i) metal oxide coating requires high temperature heat treatments in which both time and cost is being compromised compared to the invention disclosed herein, ii) requires expensive and not scalable methods e.g., pulse laser deposition, gas suspension spray, iii) inability to control the thickness and texture of the coating and iv) requires expensive chemicals. To the best of our knowledge there is no prior art pertaining to a process that uses an aqueous media for electroplating transition metal oxides on cathode and/or anode materials used in lithium-ion batteries (LIBs).

In general, the present invention discloses a method of electrodepositing a transition metal oxide or mixed transition metal oxide onto the surface of a working electrode, i.e. cathode or anode materials use in LIBs, using an aqueous media, comprising the steps of:

a) immersing a working electrode and counter electrode into an aqueous electrolyte (also called aqueous plating bath) comprising a transition metal ion source in ambient atmosphere;

b) electrodepositing a transition metal oxide or mixed transition metal oxide onto a surface of the working electrode from the aqueous plating bath at room temperature;

c) removing the electroplated working electrode from the aqueous plating bath;

d) rinsing the electroplated working electrode with water thoroughly; and e) drying the working electrode.

In a preferred embodiment, the transition metal oxide is $Co_3O_4$, $CoO$, $MnO_2$, $Mn_2O_3$, $Mn_3O_4$ or mixture of Mn and Co metal oxide $Mn_xCo_yO_z$ where x, y and z range from 0.1 to 4.

The aqueous bath is comprised of inorganic salts of either $LiOOCCH_3$ or $CoNo_3 \cdot 6H_2O$ for Co based metal oxide or $LiOOCCH_3$, $Li_2SO_4 \cdot H_2O$ and $MnSO_4 \cdot H_2O$ for Mn based metal oxide.

The thickness of the protective metal oxide coating ranges from about 1 nm to about 5 um.

The electroplating is carried out in a wide range of temperature ranging from room temperature up to about 80° C.

The working electrode is preferably dried under dynamic vacuum at a temperature of about 60° C.

The working electrode is preferably rinsed with pure water. Pure water, also known as purified water, is water from a source that has removed all impurities. Distilled water is the most common form of pure water. Pure water can be purified by carbon filtration, micro-porous filtration and ultraviolet oxidation.

In one embodiment of the present invention, the method of electrochemical deposition of transition metal oxides and/or doped transition metal oxides on a working electrode comprises the steps of: i) providing an aqueous plating bath, comprising $LiOOCCH_3$, or $LiOOCCH_3$ and $Li_2SO_4 \cdot H_2O$ mixture, ii) dissolving a transition metal salt, iii) providing a conductive substrate for both the working and the counter electrode, and iv) depositing a protective transition metal oxide material on the working electrode at temperatures ranging from 20° C. to 100° C.

The conductive counter electrode substrate used for electrodeposition preferably comprises at least one of nickel, tungsten, copper, gold, platinum, titanium, and carbon. In a preferred embodiment, the working electrode substrates used for electrodeposition are $LiCoO_2$ (LCO), $LiMn_2O_4$ (LMO), $LiMnNiCoO_2$ (NMC), $LiFePO_4$ (LFP), $LiNiCoAlO_2$ (NCA), Li-rich $Li_2MnO_3$—$LNiCoO_2$ (LRNMC) and combinations thereof.

The invention described here can be applied to cathodes and anodes of other battery and energy storage technologies like next generation Li-ion, Na-ion, Na-air, Li-air, Li—S batteries, supercapacitors etc.

DETAILED DESCRIPTION OF THE INVENTION

Electroplating of a transition metal oxide (TMO) was carried out using a 2-electrode system where a working electrode and a counter (Ni foil) electrodes were immersed into a deposition solution which contains also one or more transition metal ion sources to make single metal oxide or mixed metal oxide, respectively. If both sides of working electrode are desired to be coated, then two counter electrodes, connected to each externally, have to be employed.

The transition metal ion source can be aluminum, copper, chromium, cobalt, manganese, nickel, silver, gold, tin, platinum, zinc, tungsten, tantalum, rhodium, molybdenum, titanium, iron, zirconium, vanadium, hafnium, and the alloys thereof.

The working electrode can be an either cathode or anode active materials for LIBs. The cathode materials can be LCO, LMO, NMC, NCA, LFP or LRNMC. It can also be doped with different transition metals of LCO, LMO, NMC, NCA, LFP and LRNMC. The anode materials can be silicon, graphite, graphene based anodes, tin, and other anode materials that can be used in Li-ion or other energy storage systems. Both cathode and anode materials may consist of composite electrode which contain binder and conductive additives.

The aqueous deposition bath is prepared from inorganic salts which contains also transition metal salts. A plastic or metal container can be used to create a reaction vessel. If deposition is desired at above room temperature, metal or temperature resistant polymeric vessels should be utilized. The two-electrode system was fixed to the lid of the vessel and hung into the deposition bath. Both electrodes were connected to a power supply which can provide sufficient current or voltage densities where protective coating of metal oxide is produced.

In one embodiment, Mn based transition metal oxide is produced from 0.1 M $MnSO_4 \cdot H_2O$, $Li_2SO_4 \cdot H_2O$ and $LiOOCCH_3 \cdot 2H_2O$ was prepared using ultra-pure water for solvent to dissolve these salts. 9.72 g of $MnSO_4 \cdot H_2O$, 7.36 g of $Li_2SO_4 \cdot H_2O$ and 5.87 g of $LiOOCCH_3 \cdot 2H_2O$ were carefully dissolved in 575 ml of $H_2O$. A similar way of deposition of Mn based transition metal oxide is reported in the literature (see e.g., U.S. Pat. 8,237,538 B2, supra). The order of the salt dissolution was not an important factor but slow addition of each salts allowed for a homogenous mixture. The bath was stirred for half an hour to make sure all salts were dissolved thoroughly. The working electrode was selected from commercially available cathodes used in LIBs. LCO is one of the widely used cathode active materials for LIBs. In this experiment, we used LCO composite cathode electrodes which have carbon and polyvinylidene fluoride (PVDF) as conductive agent and binder, respectively. The binder could be one of these alternatives as well: carboxymethyl cellulose (CMC), polyacrylic acid (PAA), styrene butadiene rubber (SBR). One side of the Al foil was coated with LCO and the other side of the foil was not coated. For this reason, single Ni foil counter electrode was utilized facing towards LCO coated side. Both counter and working electrodes were clipped to copper alligators which were attached to the lid. Afterwards, the lid was submerged into the deposition solution and rested for 1-2 minutes before metal oxide deposition for wetting purposes. The wave form of the deposition procedure can vary depending on the cathode, texture, thickness, porosity and chemistry. In this specific experiment we used 1.8V voltage pulse wave forms to coat the LCO electrode with protective coating metal oxide agent. The on time for each 1.8V pulse was 1 s however it can range from 100 μs to 20 s. Between pulses, there was 1-minute open circuit voltage period i.e. resting period (ranging from 3 s to 2 minutes). This resting period allows that the coating is more porous not like a film. One can also do film-like coating with constant voltage or constant current deposition in 1 minute which is extremely fast and beneficial for the scale up process. The number of deposition cycles (duty cycle refers to on/off time) determines the thickness of the protective metal oxide coating. In this example, we electroplated protective metal oxide for 20 duty cycle which in total took 10 minutes.

Figure 1:
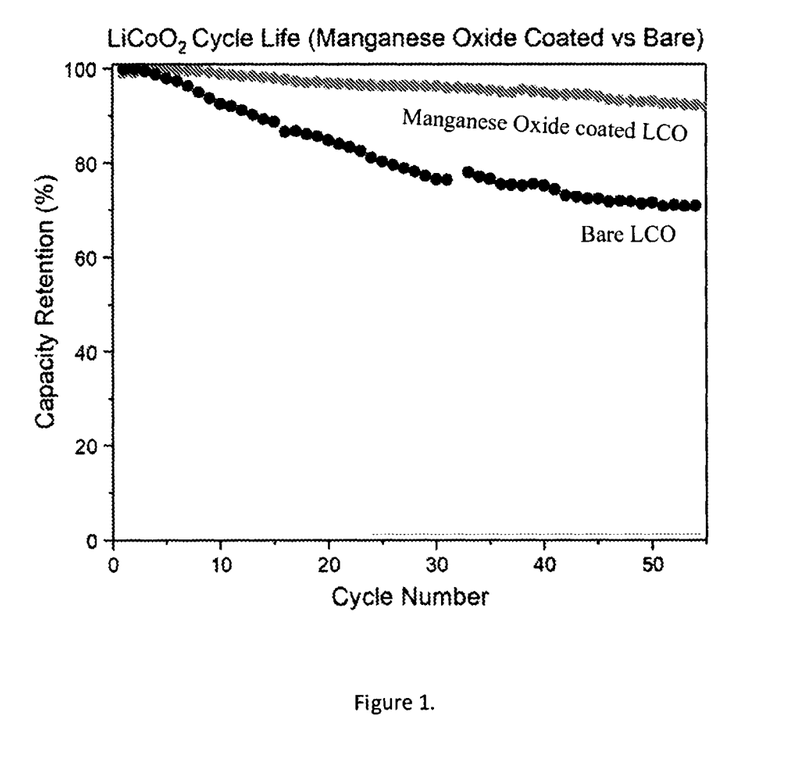
FIG. 1. Cycle life data of Mn-oxide coated LCO versus uncoated LCO electrodes cycled between 4.5 and 3V regions at C/2 rate at room temperature.

FIG. 1 shows the cycle life of Mn based metal oxide coated LCO electrode versus bare LCO cycled at 4.5-3V potential ranges at C/2 rate. The bare LCO electrode has around 2.1 mAh/cm$^2$ and has a capacity fade of 25% over 55 cycles whereas the manganese oxide coated LCO has marginal capacity fade i.e. 5% over 55 cycles. The superior cycling of manganese oxide coated LCO over bare LCO is believed to be due to the insulating buffer region created by oxide layer which protects the electrode surface from being exposed to high parasitic voltages. Though the protection layer is thin, it still creates electrical resistance which decreases the specific capacity slightly. Through electroplating parameters, optimizing this thickness can lead the desired capacity to be achieved easily.

Figure 2A:
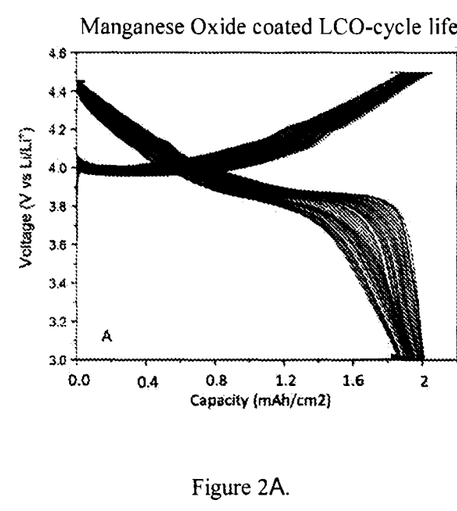
FIG. 2A. Charge and discharge voltage profiles versus capacity of Mn-oxide coated LCO electrode cycled between 4.5 and 3V regions at C/2 rate at room temperature.
Figure 2B:
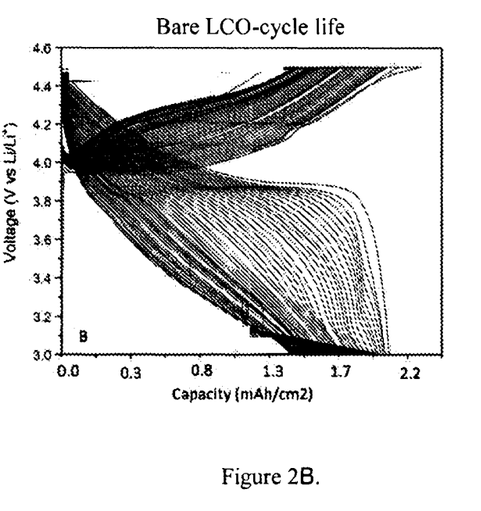
FIG. 2B. Charge and discharge voltage profiles versus capacity of uncoated LCO electrode cycled between 4.5 and 3V regions at C/2 rate at room temperature.

FIG. 2 displays the charge-discharge profiles of both manganese oxide coated LCO (A) and bare LCO (B) electrodes cycled at 4.5-3V potential range at C/2. rate. Maintaining relatively steady voltage response over the cycling condition is critical as it will determine the energy output of a LIB. In FIG. 2, it is shown that with manganese oxide coated LCO electrode, higher capacities can easily be achieved while maintaining the voltage and capacity values over 55 cycles.

In another embodiment, Mn based transition metal oxide is produced from 0.1 M $MnSO_4 \cdot H_2O$, $Li_2SO_4 \cdot H_2O$ and $LiOOCCH_3 \cdot 2H_2O$ was prepared using ultra-pure water for solvent to dissolve these salts. 9.72 g of $MnSO_4 \cdot H_2O$, 7.36 g of $Li_2SO_4 \cdot H_2O$ and 5.87 g of $LiOOCCH_3 \cdot 2H_2O$ were carefully dissolved in 575 ml of $H_2O$. The order of the salt dissolution was not an important factor but slow addition of each salt allowed for a homogenous mixture. The bath was stirred for half an hour to make sure all salts were dissolved thoroughly. The working electrode was selected from commercially available cathodes used in LIBs. LMO is one of the strong candidates that can replace currently used cathode active materials for LIBs. In this experiment, we used LMO composite cathode electrode which has carbon and polyvinylidene fluoride (PVDF) as conductive agent and binder, respectively. The binder could be one of these alternatives as well: carboxymethyl cellulose (CMC), polyacrylic acid (PAA), styrene butadiene rubber (SBR). One side of the Al foil was coated with LMO and the other side of the foil was not coated. For this reason, single Ni foil counter electrode was utilized. Both counter and working electrodes were clipped to copper alligators which were attached to the lid. Afterwards the lid was submerged into the deposition solution and rested for 1-2 minutes before metal oxide deposition for wetting purposes. The wave form of the deposition procedure can vary depending on the cathode, texture, thickness, porosity and chemistry. In this specific experiment we used 1.8V voltage pulse wave forms to coat the LMO electrode with protective coating metal oxide agent. The on time for each 1.8V pulse was 1 s however it can range from 100 μs to 20 s. Between pulses, there was 1-minute open circuit voltage period i.e. resting period (ranging from 3 s to 2 minutes). This resting period allows that the coating is more porous not like a film. One can also do film-like coating with constant voltage or constant current deposition in 1 minute which is extremely fast and beneficial for the scale up process. The number of deposition cycles (duty cycle refers to on/off time) determines the thickness of the protective metal oxide coating. In this example, we electroplated protective metal oxide for 20 duty cycle which in total took 10 minutes.

Figure 3:
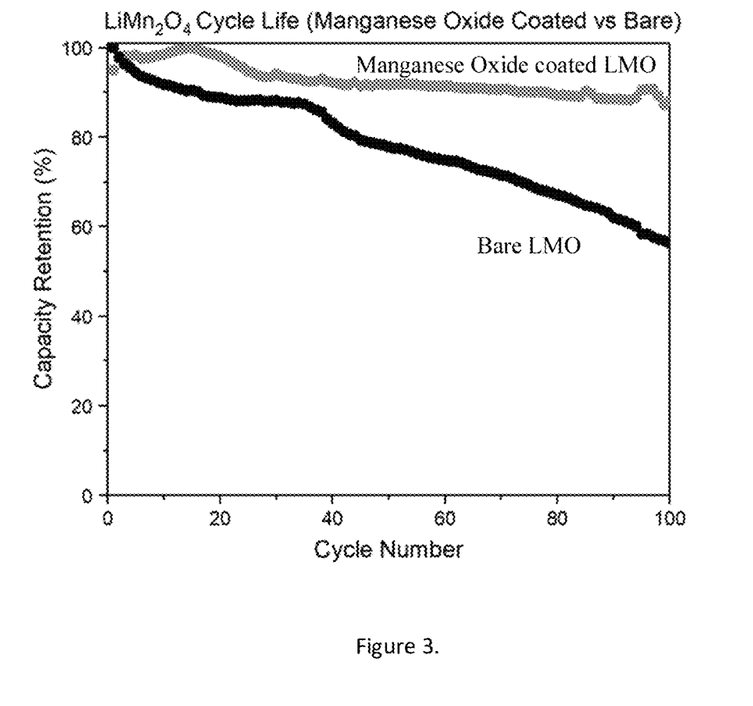
FIG. 3. Cycle life data of Mn-oxide coated LMO versus uncoated LMO electrodes cycled between 4.5 and 3V regions at C/2 rate at room temperature.

FIG. 3 demonstrates the cycle life of Mn based metal oxide coated LMO electrode versus bare LMO cycled at 4.5-3V potential ranges at C/2 rate. The bare LMO electrode has around 2 mAh/cm$^2$ and has a capacity fade of 45% over 100 cycles whereas the manganese oxide coated LMO has marginal capacity fade i.e. 10% over 100 cycles. The superior cycling of manganese oxide coated LMO over bare LMO is believed to be due to the insulating buffer region created by oxide layer which protects the electrode surface from being exposed to high parasitic voltages. Though the protection layer is thin, it still creates electrical resistance which decreases the specific capacity slightly. Through electroplating parameters, optimizing this thickness can lead the desired capacity to be achieved easily.

Figure 4A:
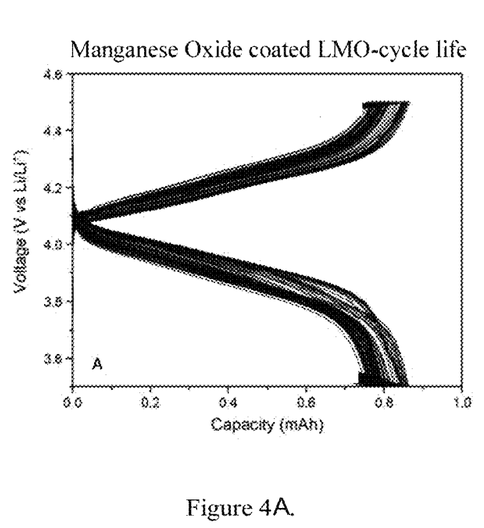
FIG. 4A. Charge and discharge voltage profiles versus capacity of Mn-oxide coated LMO electrode cycled between 4.5 and 3V regions at C/2 rate at room temperature.
Figure 4B:
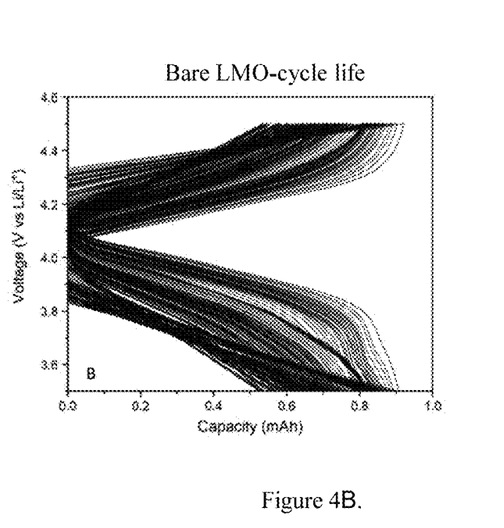
FIG. 4B. Charge and discharge voltage profiles versus capacity of uncoated LMO electrode cycled between 4.5 and 3V regions at C/2 rate at room temperature.

FIG. 4 exhibits the charge-discharge profiles of both manganese oxide coated LMO (A) and bare LMO (B) electrodes cycled at 4.5-3V potential range at C/2 rate. Maintaining relatively steady voltage response over the cycling condition is critical as it will determine the energy output of a LIB. In FIG. 4, it is shown that with manganese oxide coated LMO electrode, higher capacities can easily be achieved while maintaining the voltage and capacity values over 100 cycles.

In one embodiment, Co based transition metal oxide is produced from 0.2 M $CoNo_3 \cdot 6H_2O$ and 0.1 M $LiOOCCH_3 \cdot 2H_2O$ was prepared using ultra-pure water for solvent to dissolve these salts. 33.4 g of $CoNo_3 \cdot 6H_2O$ and 5.87 g of $LiOOCCH_3 \cdot 2H_2O$ were carefully dissolved in 575 ml of $H_2O$. The order of the salt dissolution was not an important factor but slow addition of each salts allowed for a homogenous mixture. The bath was stirred for half an hour to make sure all salts were dissolved thoroughly. The working electrode was selected from commercially available cathodes used in LIBs. LCO is one of the widely used cathode active materials for LIBs. In this experiment, we used LCO composite cathode electrodes which have carbon and polyvinylidene fluoride (PVDF) as conductive agent and binder, respectively. The binder could be one of these alternatives as well: carboxymethyl cellulose (CMC), polyacrylic acid (PAA), and/or styrene butadiene rubber (SBR). One side of the Al foil was coated with LCO and the other side of the foil was not coated. For this reason, single Ni foil counter electrode was utilized. Both counter and working electrodes were clipped to copper alligators which were attached to the lid. Afterwards the lid was submerged into the deposition solution and rested for 1-2 minutes before metal oxide deposition for wetting purposes. The wave form of the deposition procedure can vary depending on the cathode, texture, thickness, porosity and chemistry. In this specific experiment we used 1.5V voltage pulse wave forms to coat the LCO electrode with protective coating metal oxide agent. The on time for each 1.5V pulse was 1 s however it can range from 100 μs to 20 s. Between pulses, there was 1-minute open circuit voltage period i.e. resting period (ranging from 3 s to 2 minutes). This resting period allows that the coating is more porous not like a film. One can also do film-like coating with constant voltage or constant current deposition in 1 minute which is extremely fast and beneficial for the scale up process. The number of deposition cycles (duty cycle refers to on/off time) determines the thickness of the protective metal oxide coating. In this example, we electroplated protective metal oxide for 20 duty cycle which in total took 10 minutes.

In one embodiment, Co based transition metal oxide is produced from 0.2 M $CoNo_3 \cdot 6H_2O$ and 0.1 M $LiOOCCH_3 \cdot 2H_2O$ was prepared using ultra-pure water for solvent to dissolve these salts. 33.4 g of $CoNo_3 \cdot 6H_2O$ and 5.87 g of $LiOOCCH_3 \cdot 2H_2O$ were carefully dissolved in 575 ml of $H_2O$. The order of the salt dissolution was not an important factor but slow addition of each salt allowed for a homogenous mixture. The bath was stirred for half an hour to make sure all salts were dissolved thoroughly. The working electrode was selected from commercially available cathodes used in LIBs. LCO is one of the strong candidates that can replace currently used cathode active materials for LIBs. In this experiment, we used LCO composite cathode electrodes which have carbon and polyvinylidene fluoride (PVDF) as conductive agent and binder, respectively. The binder could be one of these alternatives as well: carboxymethyl cellulose (CMC), polyacrylic acid (PAA), styrene butadiene rubber (SBR). One side of the Al foil was coated with LCO and the other side of the foil was not coated. For this reason, single Ni foil counter electrode was utilized. Both counter and working electrodes were clipped to copper alligators which were attached to the lid. Afterwards the lid was submerged into the deposition solution and rested for 1-2 minutes before metal oxide deposition for wetting purposes. The wave form of the deposition procedure can vary depending on the cathode, texture, thickness, porosity and chemistry. In this specific experiment we used 1.5V voltage pulse wave forms to coat the LCO electrode with protective coating metal oxide agent. The on time for each 1.5V pulse was is however it can range from 100 μs to 20 s. Between pulses, there was 1-minute open circuit voltage period i.e., resting period (ranging from 3 s to 2 minutes). This resting period allows that the coating is more porous not like a film. One can also do film-like coating with constant voltage or constant current deposition in 1 minute which is extremely fast and beneficial for the scale up process. The number of deposition cycles (duty cycle refers to on/off time) determines the thickness of the protective metal oxide coating. In this example, we electroplated protective metal oxide for 20 duty cycle which in total took 10 minutes.

Figure 5:
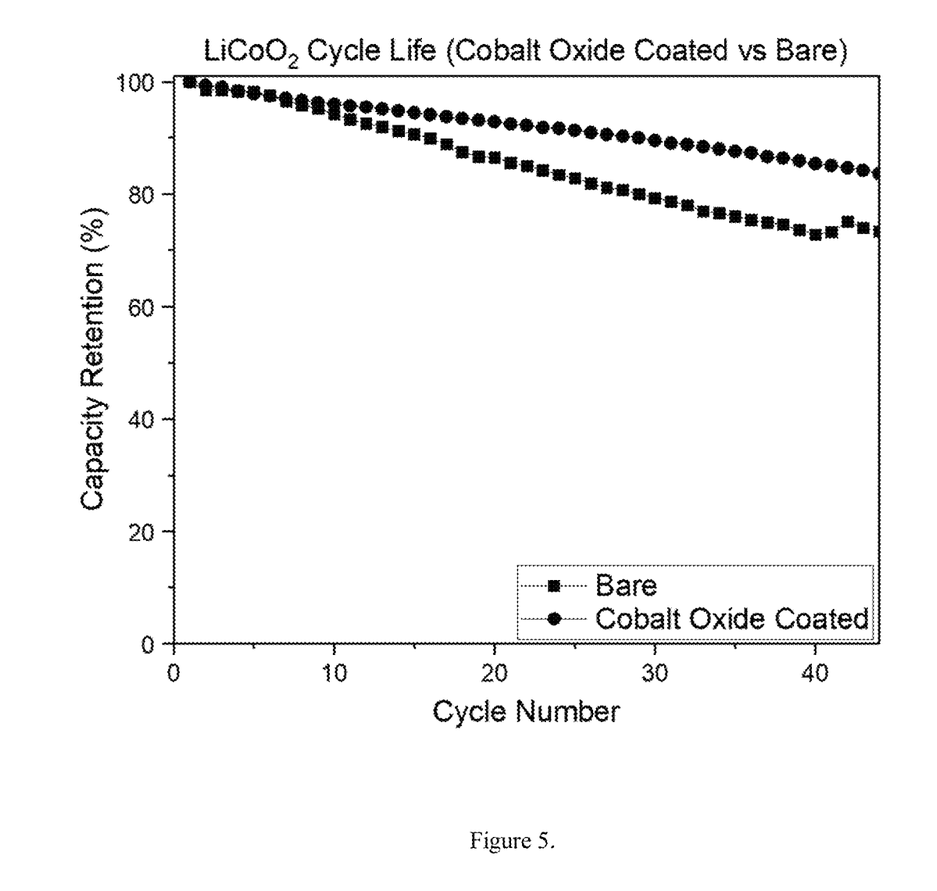
FIG. 5. Cycle life data of Co-oxide coated LCO versus uncoated LCO electrodes cycled between 4.5 and 3V regions at C/2 rate at room temperature.

FIG. 5 demonstrates the cycle life of cobalt metal oxide coated LCO electrode versus bare LCO cycled at 4.5-3V potential ranges at C/2 rate. The bare LCO electrode has around 2 mAh/cm$^2$ and has a capacity fade of 25% over 45 cycles whereas the cobalt oxide coated LCO has less capacity fade i.e. 10% over 45 cycles. The superior cycling of cobalt oxide coated LCO over bare LCO is believed to be due to the insulating buffer region created by oxide layer which protects the electrode surface from being exposed to high parasitic voltages. Though the protection layer is thin, it still creates electrical resistance which decreases the specific capacity slightly. Through electroplating parameters, optimizing this thickness can lead the desired capacity to be achieved easily.

Figure 6A:
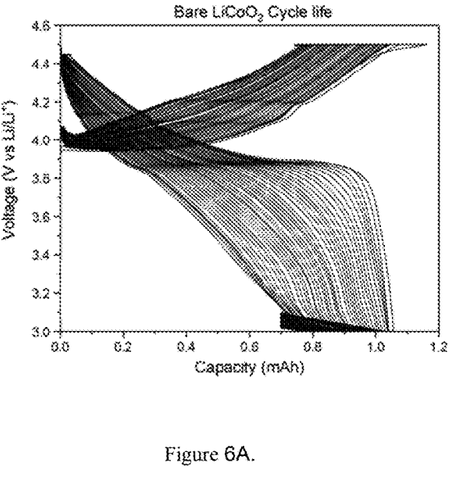
FIG. 6A. Charge and discharge voltage profiles versus capacity of uncoated LCO electrode cycled between 4.5 and 3V regions at C/2 rate at room temperature.
Figure 6B:
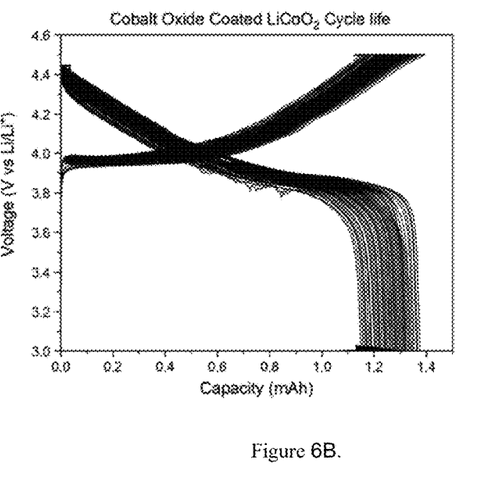
FIG. 6B. Charge and discharge voltage profiles versus capacity of Co-oxide coated LCO electrode cycled between 4.5 and 3V regions at C/2 rate at room temperature.

FIG. 6 exhibits the charge-discharge profiles of both bare LCO (A) and cobalt oxide coated LCO (B) electrodes cycled at 4.5-3V potential range at C/2 rate. Maintaining relatively steady voltage response over the cycling condition is critical as it will determine the energy output of a LIB. In FIG. 6, it is shown that with cobalt oxide coated LCO electrode, higher capacities can easily be achieved while maintaining the voltage and capacity values over 45 cycles.

In another embodiment, we synthesized the powder form of Mn based transition metal oxide to identify the structure and oxidation state of Mn that is coated on battery electrodes. For this, 0.1 M $MnSO_4 \cdot H_2O$, $Li_2SO_4 \cdot H_2O$ and $LiOOCCH_3 \cdot 2H_2O$ was prepared using ultra-pure water for solvent to dissolve these salts. 9.72 g of $MnSO_4 \cdot H_2O$, 7.36 g of $Li_2SO_4 \cdot H_2O$ and 5.87 g of $LiOOCCH_3 \cdot 2H_2O$ were carefully dissolved in 575 ml of $H_2O$. The order of the salt dissolution was not an important factor but slow addition of each salt allowed for a homogenous mixture. The bath stirred for half an hour to make sure all salts were dissolved thoroughly. In this experiment, we used Ni foil as both working and counter electrode. Both counter and working electrodes were clipped to copper alligators which were attached to the lid. Afterwards the lid was submerged into the deposition solution and rested for 1-2 minutes before metal oxide deposition for wetting purposes. In this specific experiment we used 1.8V constant voltage wave forms to coat the Ni working electrode with protective coating metal oxide agent. After 20 minutes of deposition enough powder was synthesized, scraped off and rinsed with DI water. After drying the powders at 80° C. under dynamic vacuum, XRD and scanning electron microscope (SEM) images were recorded.

Figure 7:
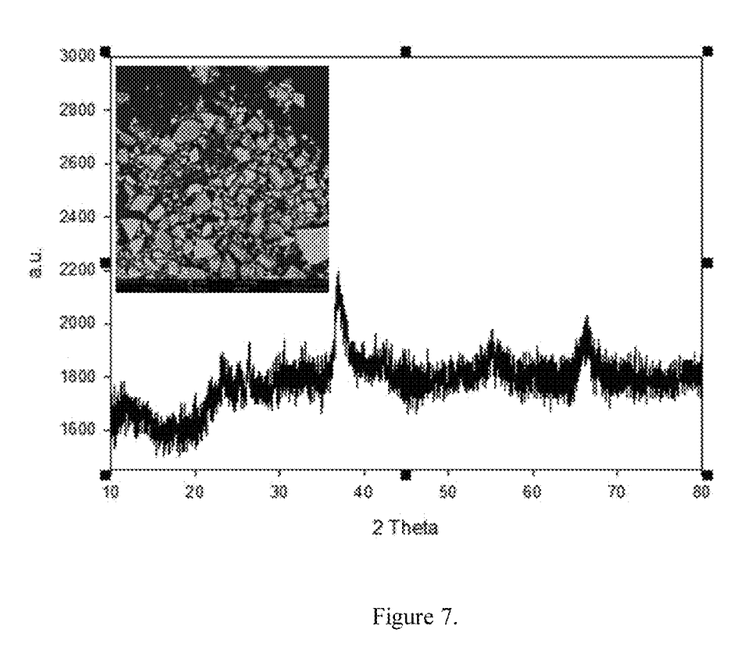
FIG. 7. XRD and SEM images of amorphous as prepared electroplated $MnO_2$ powders. The deposition temperature was room temperature (RT) and no further heat treatment was performed.

FIG. 7 shows the XRD pattern of as-prepared manganese oxide powder along with its SEM image as inset. It is clear from the XRD pattern that the peak width and shapes are not sharp due to the amorphous or poor crystallinity of the electroplated $MnO_2$. This proves that protective coating agent is $MnO_2$ where the valence state of Mn atom is 4+. Since the thickness of the protective coating agent is very thin, it is hard to obtain any useful XRD pattern from the actual coated battery electrodes. Thus, we performed our structural investigation on the powder form of metal oxide which allows us to analyze the structure-property relationship. However, we found that there is no structural difference between thick metal oxide coated on LCO or LMO versus powder form of metal oxide. SEM images show large particles which is due to the type of electroplating wave form (constant voltage) and duration of the plating condition (hours not minutes). From the XRD patterns, there are two characteristic peaks at 2θ around 37° and 66°, which can be indexed to birnessite-type $MnO_2$ (JCPDS 42-1317) (see Y. Munaiah, B. Gnana Sundara Raj, T. Prem Kumar and P. Ragupathy, Facile synthesis of hollow sphere amorphous $MnO_2$: the formation mechanism, morphology and effect of a bivalent cation-containing electrolyte on its supercapacitive behavior, *J. Mater. Chem. A*, 2013, 1, 4300-4306).

Figure 8:
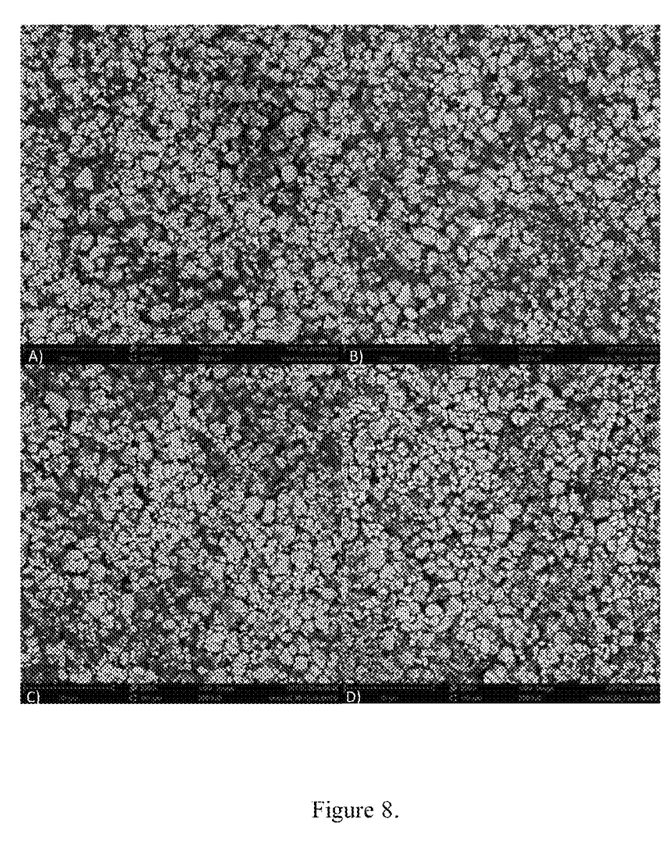
FIG. 8. SEM images of bare A-) LCO, Mn oxide coated LCO at different duty cycle of B-) 20, C-) 40, D-) 60 cycles.

In another embodiment, through SEM we have tried to observe the actual surface coating feature of $MnO_2$ as protective coating layer on commercial LCO electrodes. For this we have run different duty cycle of electroplating of $MnO_2$ on LCO electrode and compare the results with the bare LCO electrode. One duty cycle in this embodiment refers to the following electroplating conditions: 1.8V is on time followed by 1-minute rest time. Surface images from SEM are exhibited in FIG. 8 for different samples. FIG. 8A shows the surface of the bare LCO electrode which contains both carbon black and polyvinylidene fluoride (PVDF) as conductive additive and binder, respectively in addition to large micron size LCO particles. FIG. 8B shows the surface of the $MnO_2$ coated LCO electrode with 20 duty cycle. The figure shows no distinguishable features compared to bare LCO electrode at macron scale which suggests the coating of $MnO_2$ is at nanoscale. FIG. 8C displays the surface of the $MnO_2$ coated LCO electrode with 40 duty cycle, again very small changes can be observed. However, when the duty cycle is increased to 60 cycles a clear indication of surface coverage of LCO with $MnO_2$ can be observed easily. This is shown in FIG. 8D suggesting that thick $MnO_2$ particles can be formed with 60 duty cycle. With these SEM images, we concluded that $MnO_2$ particle with only 20 or 40 duty cycle cannot be clearly seen with the SEM instrument we utilized in this embodiment exceeding its resolution capabilities. Although 60 duty cycle appears intriguing, we believe this thick visible $MnO_2$ coating will diminish the specific capacity of LCO as it will create too much resistance. The electronic conductivity of $MnO_2$ is in the order of 10-6 S/cm which is poor compared to LCO electrode conductivity (see Daniel Bélanger, Thierry Brousse, and Jeffrey W. Long, Manganese Oxides: Battery Materials Make the Leap to Electrochemical Capacitors, *Electrochemical Society Interface* 17(1):49, 52 March 2008). In fact, we tested $MnO_2$ coated LCO electrode with more duty cycle than 20 and found that the specific capacity decreased more than 30%. The SEM images presented here together with electrochemical studies discussed above revealed that 20 duty cycle of $MnO_2$ coating can enhance the cycle life of LCO at high voltages without compromising the specific capacity.

In another embodiment, we also coated one of the next generation anode materials i.e. Si by $MnO_2$ to offer further proof that this technique is versatile not only for cathode materials but also for anode materials used in LIBs. In this example, however the total deposition time did not exceed a few minutes in order to protect Si from excessive water exposure as the deposition medium is aqueous. We electroplated Mn based transition metal oxide on Si anode material. For this, 0.1 M $MnSO_4 \cdot H_2O$, $Li_2SO_4 \cdot H_2O$ and $LiOOCCH_3 \cdot 2H_2O$ was prepared using ultra-pure water for solvent to dissolve these salts. 9.72 g of $MnSO_4 \cdot H_2O$, 7.36 g of $Li_2SO_4 \cdot H_2O$ and 5.87 g of $LiOOCCH_3 \cdot 2H_2O$ were carefully dissolved in 575 ml of $H_2O$. The order of the salt dissolution was not an important factor but slow addition of each salt allowed for a homogenous mixture. The bath stirred for half an hour and made sure all salts were dissolved thoroughly. In this experiment, we used Si electrode and Ni foil as working and counter electrode, respectively. Both counter and working electrodes were clipped to copper alligators which were attached to the lid. Afterwards the lid was submerged into the deposition solution. In this specific experiment we used 1.8V pulses to coat the Si anode as working electrode with manganese oxide. The on time for voltage pulses were 5 s which is followed by 10 s rest time and duty cycled varied between 2-10 cycles. The plating condition can be varied and modified in order to meet the thickness, texture or morphology requirement.

In another embodiment, $CoMn_2O_4$ was electroplated on commercial LMO electrode. For this, 0.05 M $CoNO_3.6H_2O$ and 0.1 M $MnSO_4 \cdot H_2O$, $Li_2SO_4 \cdot H_2O$ and $LiOOCCH_3 \cdot 2H_2O$ was prepared using ultra-pure water for solvent to dissolve these salts. 8.35 g of $CoNo_3 \cdot 6H_2O$, 9.72 g of $MnSO_4 \cdot H_2O$, 7.36 g of $MnSO_4 \cdot H_2O$ and 5.87 g of $LiOOCCH_3 \cdot 2H_2O$ were carefully dissolved in 575 ml of $H_2O$. The order of the salt dissolution was not an important factor but slow addition of each salt allowed for a homogenous mixture. The bath was stirred for half an hour to make sure all salts were dissolved thoroughly. The working electrode was selected from commercially available cathodes used in LIBs. LMO is one of the strong candidates that can replace currently used cathode active materials for LIBs. In this experiment, we used LMO composite cathode electrode which has carbon and polyvinylidene fluoride (PVDF) as conductive agent and binder, respectively. The binder could be one of these alternatives as well: carboxymethyl cellulose (CMC), polyacrylic acid (PAA), and/or styrene butadiene rubber (SBR). One side of the Al foil was coated with LMO and the other side of the foil was not coated. For this reason, single Ni foil counter electrode was utilized. Both counter and working electrodes were clipped to copper alligators which were attached to the lid. Afterwards the lid was submerged into the deposition solution and rested for 1-2 minutes before metal oxide deposition for wetting purposes. The wave form of the deposition procedure can vary depending on the cathode, texture, thickness, porosity and chemistry. In this specific experiment we used 1.8V voltage pulse wave forms to coat the LMO electrode with protective coating metal oxide agent. The on time for each 1.8V pulse was 1 s however it can range from 100 μs to 20 s. Between pulses, there was 1-minute open circuit voltage period i.e. resting period (ranging from 3 s to 2 minutes). This resting period allows that the coating is more porous not like a film. One can also do film-like coating with constant voltage or constant current deposition in 1 minute which is extremely fast and beneficial for the scale up process. The number of deposition cycles (duty cycle refers to on/off time) determines the thickness of the protective metal oxide coating. In this example, we electroplated protective metal oxide for 20 duty cycle which in total took 10 minutes.

In another embodiment, we also coated graphite anode by $MnO_2$ to offer further proof that this technique is versatile not only for cathode materials but also for anode materials used in LIBs. We electroplated Mn based transition metal oxide on graphite anode material. The anode composite electrode consisted of polyvinylidene fluoride (PVDF) and super P carbon as binder and conductive agent, respectively. The binder could be one of these alternatives as well: carboxymethyl cellulose (CMC), polyacrylic acid (PAA), and/or styrene butadiene rubber (SBR). 0.1M $MnSO_4 \cdot H_2O$, $Li_2SO_4 \cdot H_2O$ and $LiOOCCH_3 \cdot 2H_2O$ was prepared using ultra-pure water for solvent to dissolve these salts. 9.72 g of $MnSO_4 \cdot H_2O$, 7.36 g of $Li_2SO_4 \cdot H_2O$ and 5.87 g of $LiOOCCH_3 \cdot 2H_2O$ were carefully dissolved in 575 ml of $H_2O$. The order of the salt dissolution was not an important factor but slow addition of each salt allowed for a homogenous mixture. The bath stirred for half an hour and made sure all salts were dissolved thoroughly. In this experiment, we used graphite electrode and Ni foil as working and counter electrode, respectively. Both counter and working electrodes were clipped to copper alligators which were attached to the lid. Afterwards the lid was submerged into the deposition solution. In this specific experiment we used 1.8V pulses to coat the graphite anode as working electrode with manganese oxide. The on time for voltage pulses were 5 s which is followed by 10 s rest time and duty cycled varied between 2-10 cycles. The plating condition can be varied and modified in order to meet the thickness, texture or morphology requirement.

What is claimed is:

1. A method of electrodepositing a transition metal oxide on to the surface of cathode or anode materials used in Li-ion batteries, using an aqueous media, comprising the steps of:
   (a) immersing a working electrode and a counter electrode into an aqueous plating bath comprising a transition metal ion source in an ambient atmosphere;
   (b) electrodepositing an electrochemically active transition metal oxide onto a surface of the working electrode from the aqueous plating bath at a temperature ranging from about 20° C. to about 80° C.;
   (c) removing the electroplated transition metal oxide working electrode from the aqueous plating bath;
   (d) rinsing the electroplated transition metal oxide working electrode; and
   (e) drying the electroplated transition metal oxide working electrode.

2. The method of claim 1 wherein the transition metal oxide is selected from the group consisting of $Co_3O_4$, $CoO$, $MnO_2$, $Mn_2O_3$, $Mn_3O_4$ or a mixture of Mn and Co metal oxide $Mn_xCo_yO_z$ where x, y and z range from 0.01 to 4.

3. The method of claim 2 wherein the transition metal oxide is Co based and wherein the aqueous plating bath is comprised of inorganic salts selected from the group consisting of $LiOOCCH_3$, $CoNO_3$—$6H_2O$ and mixtures thereof.

4. The method of claim 2 wherein the transition metal oxide is Mn based and wherein the aqueous plating bath is comprised of inorganic salts selected from the group consisting of $LiOOOCCH_3$ $Li_2SO_4$—$H_2O$, $MnSO_4$—$H_2O$ and mixtures thereof.

5. The method of claim 1 wherein the electrodeposited transition metal oxide has a thickness that ranges from about 1 nm to about 5 um.

6. The method of claim 1 wherein the electrodepositing in step (b) is carried out at room temperature and under ambient atmosphere.

7. The method of claim 1 wherein the rinsing in step (d) is carried out using pure water.

8. The method of claim 1 wherein the drying of the working electrode in step (e) is carried out under dynamic vacuum at a temperature of about 80° C.

9. The method of claim 1 wherein the transition metal ion source in step (a) is selected from the group consisting of aluminum, copper, chromium, cobalt, manganese, nickel, silver, gold, tin, platinum, zinc, tungsten, tantalum, rhodium, molybdenum, titanium, iron, zirconium, vanadium, hafnium, and the alloys thereof.

10. The method of claim 1 wherein the working electrode used for electrodeposition is comprised of a cathode active material selected from the group consisting of $LiCoO_2$ (LCO), $LiMn_2O_4$ (LMO), $LiMnNiCoO_2$ (NMC), $LiFePO_4$ (LFP), $LiNiCoAlO_2$ (NCA), Li-rich $Li_2MnO_3$—$LiNiCoO_2$ (LRNMC) electrodes and combinations thereof.

11. The method of claim 10 wherein the cathode active material is selected from the group consisting of $LiCoO_2$ (LCO), $LiMn_2O_4$ (LMO), and combinations thereof.

12. The method of claim 10 wherein the cathode active material further comprises a conductive agent and a binder.

13. The method of claim 12 wherein the conductive agent is carbon and the binder is polyvinylidene fluoride.

14. The method of claim 1 wherein the working electrode used for electrodeposition is comprised of an anode active material selected from the group consisting of silicon, graphite, graphene based anodes, tin, and combinations thereof.

15. The method of claim 14 wherein the anode active material is silicon, graphite, and combinations thereof.

16. The method of claim 14 wherein the cathode active material further comprises a conductive agent and a binder.

17. The method of claim 16 wherein the conductive agent is carbon and the binder is polyvinylidene fluoride.

18. The method of claim 1 wherein the counter electrode is selected from the group consisting of nickel, tungsten, copper, gold, platinum, titanium, carbon and mixtures thereof.

* * * * *